United States Patent Office 3,386,485
Patented June 4, 1968

3,386,485
FABRICLESS PNEUMATIC TIRES
Stanley R. Harrison, Castle Bromwich, John V. Bennett, Redditch, Robert M. Broughton, Sutton Coldfield, and Clive S. Thawley, Tamworth, England, assignors to The Dunlop Company Limited, London, England, a British company
Filed Aug. 1, 1966, Ser. No. 569,388
Claims priority, application Great Britain, Aug. 12, 1965, 34,474/65
12 Claims. (Cl. 152—330)

This invention relates to pneumatic tyres (tires) and particularly to pneumatic tires which do not have a reinforcing fabric built into their structure.

According to the present invention a fabricless pneumatic tire comprises a pair of spaced beads and a shaped flexible composition extending from one bead to the other to form the sidewall portions and tread portion of the tire, said flexible composition comprising (A) an interpolymer of ethylene with a vinyl alkanoic ester, an alkyl acrylate, an alkyl methacrylate or an unsaturated acid in which the olefine portion is present in an amount of at least 60 percent by weight of the interpolymer or blends of such interpolymers with natural or synthetic rubbers, (B) a blend of a crystalline olefine homopolymer or copolymer with a natural or synthetic rubber or with a rubbery homopolymer of an alpha-olefine or copolymers of an alpha-olefine, or (C) a plastomeric copolymer of ethylene and an alpha-olefine containing at least 50 mole percent of ethylene and in which portions of the molecular chain contain blocks of polyethylene or a blend of such a copolymer with a crystalline polymer or copolymer of ethylene or alpha-olefine containing crystalline material in an amount of up to 40 percent by weight of the blend.

The invention also includes a method of manufacturing a fabricless pneumatic tire which comprises moulding a flexible composition (A), (B) or (C) referred to above into the form of sidewalls and tread portion of a pneumatic tire and including a pair of spaced bead wires. In the case of non-cross-linked compositions (A), (B) or (C) one method is to mould the composition into the form of half-tires each comprising a sidewall and half the tread portion and a pair of corresponding half-tires are brought together in a mould and united together with the insertion of the pair of bead wires and alternative methods include injection or transfer moulding a complete tire by injecting into a closed mould containing bead wires already positioned using rubber or plastic strips or blocks or some ferrules. For cross-linked compositions the preferred method is to transfer or injection mould through multipoint gates on the sidewall of the tire or through a ring gate at the centre of the tread.

The invention provides a pneumatic tire that does not contain a reinforcing fabric built into the tire and the tires can be processed more rapidly and economically than conventional pneumatic tires. The compositions employed in the present invention are particularly suitable for the manufacture of cycle tires and for this purpose the composition, after shaping into the form of a tire, should have a Young's Modulus of at least $4.5 \times 10^2$ pounds per square inch and an elongation (creep) of not more than 15 percent in length when subjected to a load of 100 pounds per square inch of sectional area at a temperature of 30° C. over a period of one month. The compositions should have a flexural fatigue life of at least one million flexes and preferably at least four million flexes.

The method of determining the flexural fatigue life is to flex a substantially U-shaped piece of the composition in which the depth of the U is approximately 2 inches between this depth and a depth of 1 inch.

The pneumatic tire is formed from Composition A, B or C as referred to above. Any of the Compositions (A), (B) or (C) can be cross-linked by suitable cross-linking or vulcanization agents such as organic peroxides, e.g. dicumyl peroxide, and sulphur or, if desired, by irradiation. The use of thermoplastic compositions, however, has the advantage that scrap and other waste trim may be re-used.

Composition A which can be employed comprises an interpolymer of ethylene with a vinyl alkanoic ester, an alkyl acrylate, an alkyl methacrylate or an unsaturated acid in which the olefine portion is at least 60 percent by weight of the interpolymer. Blends of different interpolymers of this type may be used. Typical interpolymers that can be used are a copolymer of ethylene and vinyl acetate and a copolymer of ethylene and ethyl acrylate. In the case of ethylene-vinyl acetate copolymers it is preferred to use copolymers with a vinyl acetate content of from 5 to 30 percent by weight, particularly from 10 to 25 percent by weight. Two or more copolymers of vinyl acetate and ethylene containing different proportions of vinyl acetate can be blended to give the final desired vinyl acetate content. For ethyl acrylate-ethylene copolymers similar contents of ethyl acrylate to ethylene are preferred.

In the case of copolymers of ethylene and unsaturated acids, it is preferred to use unsaturated monocarboxylic acids such as acrylic acid, methacrylic acid, itaconic acid, crotonic acid and sorbic acid although dibasic acids, e.g. maleic acid may be used. Mixtures of different dicarboxylic acids can be used and metal salts of the acid in which the metal has a valency of from 1 to 4, e.g. sodium or zinc salts, can be used to form terpolymers with the ethylene and a free acid. A typical interpolymer is a terpolymer of ethylene, methacrylic acid and sodium methacrylate or a terpolymer of ethylene, unsaturated acid, and other monomers such as vinyl alkanonic esters in which part of the acid is present as a metal salt.

The interpolymers can contain up to 40 percent by weight of the unsaturated carboxylic acid based on the weight of the copolymer but preferably contain up to 20 percent by weight. If a metal salt of an acid is used the metal is usually present in an amount of at least 10 percent, preferably at least 50 percent of the stoichiometric equivalent to the carboxylic acid. The interpolymers are thermoplastic and usually have a lower softening point than homopolymers of the olefine.

Preferably, the interpolymers comprising Composition (A) contain a number of thermolabile cross-linkages to increase the hardness and stiffness of the solid mixture so produced. This can be achieved by employing a terpolymer with a metal salt of the acid as described above, and/or a metal salt can be reacted with the copolymer at elevated temperatures such that the volatiles are removed prior to use of the interpolymer. The compositions containing the thermolabile cross-linkages remains thermoplastic although the viscosity of the molten composition is greater than that of a composition which does not contain the thermolabile cross-linkages. The thermolabile cross-linked composition has an increased hardness and toughness as compared to a non-cross-linked composition.

The agent used to introduce the thermolabile cross-linkages into the interpolymer is an inorganic metal compound that allows the metal ions to become associated with the reactive carboxyl groups in the polymer and typical metal compounds which can be used are the acetates, oxides, carbonates and hydroxides. Preferably, mono- or divalent metal compounds are used and examples of suitable compounds are the acetates of sodium and potassium or the oxides of calcium, magnesium and zinc. Compounds of trivalent and tetravalent metals such as aluminium or lead can also be used.

The amount of the thermolabile cross-linking agent this is mixed with the interpolymer is usually such that the total amount of metal ions including the metal ions from the metal salt of the acid is less than the stoichiometric equivalent as, has hereinbefore, been defined. Two or more different thermolabile cross-linking agents can be employed, if desired.

The interpolymers or copolymers comprising Composition (A) may also contain, in addition to ethylene, other higher olefines such as propylene and butylene and may also be used as blends with natural or synthetic rubbers.

Composition B comprises a blend of a crystalline olefine homopolymer or copolymer with a natural or synthetic rubber or with a rubbery homopolymer of an alpha-olefine or copolymers of an alpha-olefine. Typical compositions are those based on polyethylene or polypropylene mixed with a natural or synthetic rubber or similar mixtures containing copolymers of, say, ethylene and propylene or ethylene and butene instead of the polyethylene or polypropylene. Any of the known types of synthetic rubber can be used. Rubbery copolymers of ethylene and propylene can be mixed with the crystalline olefine homopolymer or copolymer. Usually, the blend is composed of at least 15 to 70 percent by weight of the crystalline homopolymer or copolymer based on the total weight of the blend including any additional compounding ingredients. If the blends are used as thermoplastics, those containing from 40 to 60 percent by weight of the crystalline homopolymer are preferred. However, if cross-linkable or vulcanizable, those containing 20 to 50 parts by weight are preferred. A particularly useful blend is obtained employing a copolymer of polypropylene with a small amount of ethylene as the crystalline material blended with a rubbery copolymer of ethylene and propylene since such blends show an improvd flex-life as compared with blends containing crystalline polypropylene. Similarly, copolymers of ethylene and butene or higher olefines are advantageously prepared into blends with butyl rubber rather than homopolylene.

The third type of composition that can be used as Composition (C) which comprises a plastomeric copolymer of ethylene and an alpha-olefine containing at least 50 mole percent of ethylene and in which portions of the molecular chain contain blocks of polyethylene. Such copolymers can be blended with crystalline homopolymers or copolymers of ethylene and alpha-olefines in which the crystalline material is up to 40 percent by weight of the blend. Preferably, the ethylene content of the plastomeric copolymer is from 70 to 90 mole percent. When this is blended with a crystalline homopolymer or copolymer then, preferably, the amount of the crystalline homopolymer or copolymer is not in excess of 25 percent by weight of the blend. The Composition (C) can be cross-linked by means of peroxides or by irradiation and in this case plastomeric copolymers containing 60 to 80 mole percent of ethylene are preferred.

In compositions comprising blends of (1) crystalline homopolymers or copolymers of alpha-olefines with (2) natural or synthetic rubbers (i.e. Composition B), or with (3) plastomeric copolymers of ethylene and higher alpha-olefines (i.e. Composition C), it is essential that the temperature of the mixing of the ingredients of the blend is above the melting point of the crystalline constituent throughout the mixing operation.

It has been found possible to orient the composition by subsequently milling the prepared blend at a temperature below the melting point of the crystalline component producing a fibrous oriented poly-alpha-olefine structure within the matrix. This material has considerably different physical properties with and across the direction of orientation. This orientation may also be produced when the composition is either compounded with vulcanizing ingredients or is calendered or transfer moulded, provided process temperatures are kept below the melting point of the crystalline component. Excessive milling, etc., of such blends at low temperatures, however, should be avoided as this will cause degradation of the crystalline phase.

Alternatively, if orientation is not required, with thermoplastic compositions, the mixing and moulding operations are carried out at temperatures above the softening point of the crystalline component and for vulcanizable or cross-linkable compositions the addition of vulcanizing ingredients is still carried out on a cool mill to avoid scorch but the final moulding must be effected at a temperature such that any orientation is destroyed.

Three methods for the preparation of pneumatic cycle tires according to the invention will now be described by way of example only with reference to the accompanying drawings, in which.

Figure 1:
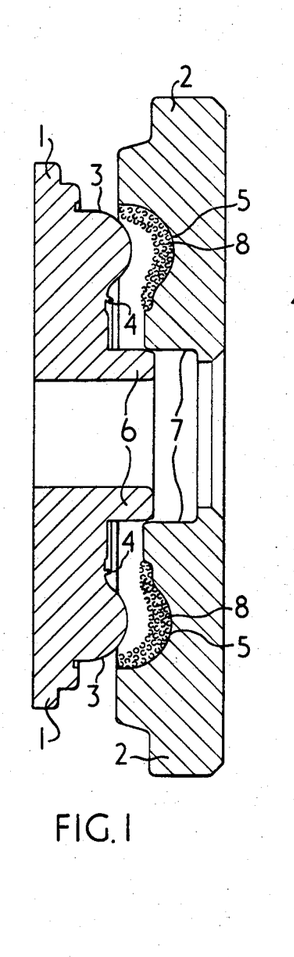
FIGURE 1 is a section through a mould at an early stage in the manufacturing process.
Figure 2:
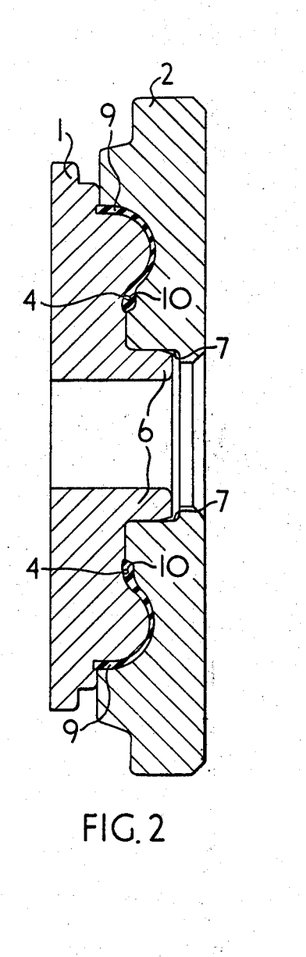
FIGURE 2 is a section through a mould of FIGURE 1 at a subsequent stage in the manufacturing process.
Figure 3:
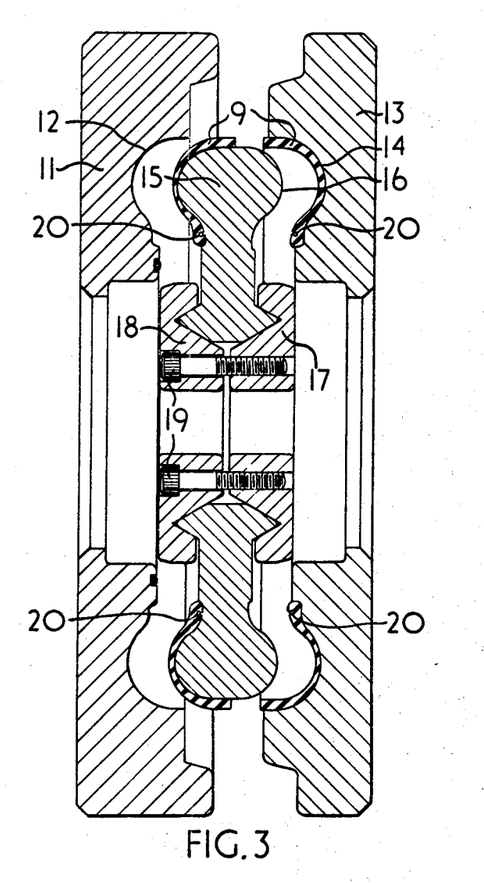
FIGURE 3 is a section through a mould showing the formation of the pneumatic tire.

In the first of the methods for the manufacture of pneumatic cycle tires according to the present invention as illustrated in FIGURES 1, 2 and 3, the composition from which the tire is to be formed is blended and compounded with additional ingredients as desired. The method described is of particular value for the manufacture of tires from thermoplastic materials.

As shown in FIGURE 1 a mould for the production of half-shells of half-tires consisting of one sidewall region, together with a bead region and one-half of a tread portion, comprises two separate mould haves 1 and 2. The upper mould half 1 as shown in FIGURE 1 has a moulding surface 3 having a shape substantially equal to the inner shape of the half-tire desired and is provided with an annular protuberance 4 to produce a slot in the bead region of the half-tire to be produced. The lower mould half 2 has a moulding surface 5 in the form of an annular recess shaped to conform to the external shape of the half-tire desired, and the upper mould half 1 has a central annular abutment 6 which is slidable within a central recess 7 in the lower mould half 2.

As shown in FIGURE 2 the blended composition 8 to be used for the manufacture of the half-tire is placed in the shaped recess 5 in either sheet or granular form in the lower mould half 2, and the upper mould half 1 lowered on to the lower mould half 2 to effect shaping of the composition into the desired half-tire 9. The protuberance 4 produces a slot 10 in the bead region of the half-tire 9. During this moulding operation the mould is heated to effect flow of the thermoplastic material into the desired shape.

Two half-tires are then moulded together in the mould shown in FIGURE 3. This mould comprises an upper half 11 having an annular moulding surface 12 corresponding to one-half of the external shape of the tire and a lower mould half 13 having an annular moulding surface 14 similar in shape to that of the upper moulding half 11. A central annular moulding former 15 having a moulding surface 16 corresponding to the internal surface of the desired completed tire is carried on clamping members 17, 18 held together by a number of bolts 19. One half-tire 9 is positioned on the moulding surface 14 of the lower mould half 13. Another half-tire 9 is positioned on the mould member 15 and the different parts of the mould brought together to effect joining of the two half-tires by heat and pressure. Prior to positioning the mould halves 9 in the mould, bead wires 20 are positioned in the slots 10 in each half-tire and during the final moulding operation the slots are closed around the bead wire located within them.

Figure 4:
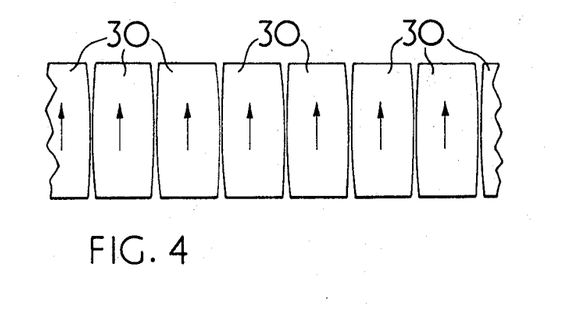
FIGURE 4 is a diagram showing the shape of the blanks for the formation of a pneumatic tire by a different method.
Figure 5:
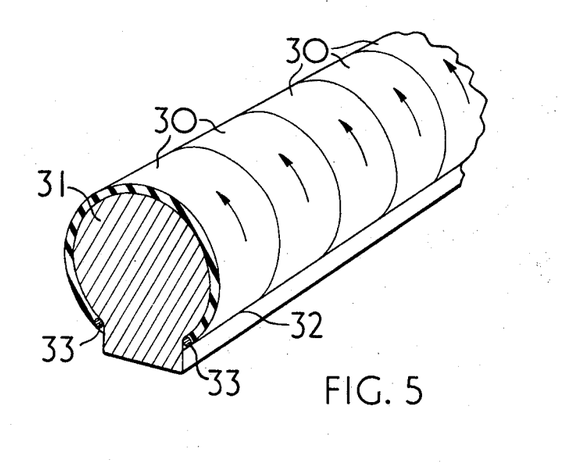
FIGURE 5 illustrates a further step in the method.

An alternative method for the manufacture of a cycle tire is shown in FIGURES 4 and 5 which method is particularly suitable for the preparation of tires from oriented compositions. The oriented composition, after blending, is taken from the mill at the desired thickness and a number of blanks 30 are cut, as shown in FIGURE 4. The blanks are slightly barrel-shaped, in plan view, to permit them to be fitted on an annular substantially cylindrical former or core 31, as shown in FIGURE 5. The blanks 30, after assembly on the solid metal annular core, are fitted at the base 32 of the blanks, with bead wires 33 and a block of a cured rubber composition to complete the shape of the bead region and to hold the bead in position. The former 31, together with the blanks, and the bead wires can then be positioned between mould halves of a mould similar to that shown in FIGURE 3 to effect consolidation and formation of the fabricless cycle tire by the application of heat and pressure.

Figure 6:
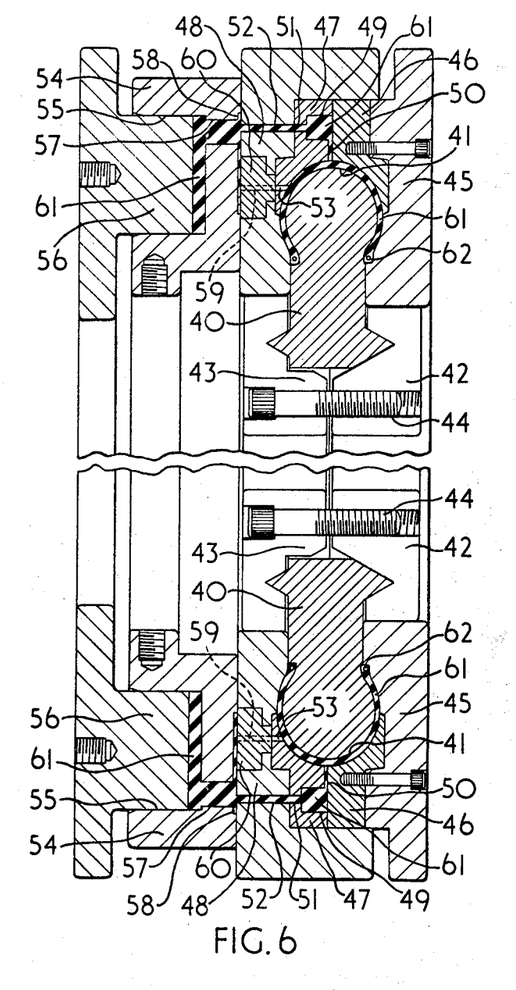
FIGURE 6 shows a section through a mould during the transfer moulding of a pneumatic tire.

An alternative method of moulding pneumatic cycle tires in accordance with the invention is shown in FIGURE 6, which illustrates a transfer mould. Basically, the mould consists of an annular mould insert 40 having a moulding surface 41 shaped to the internal profile of the desired tire. The annular mould insert 40 is held by ring-clamping members 42, 43, locked together by means of a number of bolts 44. The moulding cavity is additionally defined by mould members 45, 46, 47, 48 which are easily detachable from one another to permit easy removal of the tire after moulding. The mould member 47 is provided with a chamber 49 having a number of transfer ports 50 opening into the moulding cavity of the mould and a number of transfer ports 51 each in register with a transfer port 52 in the mould member 48. The mould member 48 is provided additionally with a number of transfer ports 53 located adjacent the sidewall regions of the moulding cavity which, if desired, can be closed should the mould be used for the production of fabricless tires from oriented material. The transfer ports 50 are located on approximately the mid-circumferential plane of the tire to be produced in the moulding cavity.

The mould shown in FIGURE 6 also comprises an upper portion 54 defining an annular transfer pot 55 in which there is slidably positioned an annular piston 56, movement of which is designed to force the composition to be moulded into the moulding cavity of the mould. Transfer of the composition to be moulded from the pot 55 is effected through a number of transfer ports 57 each in register with a transfer port 51. Additionally or optionally, material can be transferred to the moulding cavity through the transfer port 53 by means of a transfer channel 58 and a number of transfer ports 59 each located in a bush member 60 carried by said mould member 48. When it is desired to produce a tire from an oriented material, then the bush members 60 are solid bush members without having a transfer port 59, and as shown in FIGURE 6 each bush member 60 is a solid one although the transfer port 59 is indicated by dotted lines to avoid the unnecessary duplication of drawings.

In use, the desired quantity of the composition 61 to be moulded is placed within the annular pot 55 and the piston 56 lowered to effect transfer of the composition through the ports 57, 51 and 50 into the moulding chamber. The heated composition so transferred is moulded into the shape of the tire. Previous to transferring the composition to be moulded, bead wires 61 are located in the moulding chamber by means of strips of rubber or rubber blocks, and these become moulded into an integral structure during the transfer moulding operation.

Many of the compositions of the present invention are thermoplastic and waste material can be re-used easily.

The invention is illustrated in the following Examples:

EXAMPLE I

A copolymer of ethylene and vinyl acetate, containing 18 percent vinyl acetate by weight, of melt-flow index according to ASTM D.1238 or 2.5 g./10 min. and an intrinsic viscosity of 0.57 in Decalin at 135° C. and containing 5 percent by weight of the copolymer of titanium dioxide was found to have a maximum percent creep of 7 percent and a Young's modulus of $6.3 \times 10^3$ p.s.i. The composition also had a flexural fatigue life of 5 million flexes or above.

Half-shells of a cycle tire having a moulded groove to hold the steel bead wire were prepared by mouding according to the method described previously in this specification, using a temperature of 175° C. Two half-shells with bead wires inserted in the moulded grooves were joined by moulding at 175° C. around a solid former in a final patterned tire mould and subsequently cooling the mould before opening.

The moulded cycle tire was put on a spoked cycle wheel, inflated with a standard butyl inner tube to 30 p.s.i. and was run against a smooth drum of diameter 18 inches having a peripheral speed of 15 m.p.h. under a load applied on the axle of a wheel of 112 lb. The tyre had run the equivalent of 400 miles before tests were discontinued. Similar tires were fitted to a bicycle, inflated to 30 p.s.i. and were ridden around and found to have similar characteristics to conventional cycle tires.

EXAMPLE II

A copolymer of ethylene and vinyl acetate, containing 16 percent vinyl acetate by weight of melt-flow index (D.1238) of 1.5 g./10 min. and intrinsic viscosity of 0.79 in Decalin at 135° C. containing 5 percent by weight of the copolymer of titanium dioxide was found to have a maximum percent creep of 6 percent and a Young's modulus of $6.6 \times 10^3$ p.s.i. The composition also had a flexural fatigue life of 8 million flexes or above.

A tire was moulded as described in Example I, inflated to 30 p.s.i. and run for 900 miles before tests were discontinued.

EXAMPLE III

A copolymer of ethylene and vinyl acetate containing 15 percent vinyl acetate by weight, of melt-flow index (D.1238) of 2.5 g./10. min. and intrinsic viscosity of 0.91 in Decalin at 135° C. containing 5 percent by weight of the copolymer of titanium dioxide was found to have a maximum percent creep of 4 percent and a Young's modulus of $8.2 \times 10^3$ p.s.i. The composition also had a flexural fatigue life of 3 million flexes or above.

A satisfactory tire was moulded as described in Example I was inflated to 30 p.s.i. and run for 100 miles before tests were discontinued.

EXAMPLE IV

A copolymer of ethylene and ethyl acrylate, containing 15 percent of ethyl acrylate by weight, of melt-flow index (D.1238 of 2.5 g./10 min. and an intrinsic viscosity of 0.52 in Decalin at 135° C. and containing 5 percent by weight of the copolymer of titanium dioxide was found to have a maximum percent creep of 5 percent and a Young's modulus of $8.5 \times 10^3$ p.s.i. The composition also had a flexural fatigue life of 5 million flexes or above.

Tires moulded in a manner similar to that of Example I were inflated to 30 p.s.i. and ran for 60 miles before tests were discontented.

EXAMPLE V

A copolymer of ethylene and methacrylic acid, containing 9 percent by weight of the acid which is mainly in the form of the zinc or magnesium salt, of melt-flow index (D.1238) 0.75 g./10 min. and intrinsic viscosity of 0.21 in Decalin 135° C. and containing 5 percent by weight of the copolymer of titanium dioxide was found to have a maximum percent creep of 2 percent and a Young's modulus of $3.6 \times 10^4$ p.s.i. The composition also had a flexural fatigue life of 1 million flexes or above.

A tyre was moulded as described in Example I, inflated to 30 p.s.i. and ran for 50 miles before tests were discontinued.

EXAMPLE VI

A copolymer of ethylene and acrylic acid containing 14 percent by weight of acrylic acid of melt-flow index (D.1238) 20 g./10 min. and intrinsic viscosity of 0.2 in Decalin at 135° C. and containing 5 percent by weight of the copolymer of titanium dioxide was found to have a maximum percent creep of 3 percent and a Young's modulus of $2.7 \times 10^4$ p.s.i. The composition also had a flexural fatigue life of 1.5 million flexes or above.

A tyre was moulded as described in Example I inflated to 30 p.s.i. and run for 100 miles before tests were discontinued.

EXAMPLE VII 60 parts by weight of a copolymer of ethylene and vinyl acetate containing 10 percent vinyl acetate by weight of melt-index (D.1238) 4 g./10 min. and an intrinsic viscosity of 0.87 in Decalin at 135° C. was blended with 40 parts by weight of a similar copolymer containing 28 percent vinyl acetate, of melt-index 3.5 g./10 min. and intrinsic viscosity of 0.61 in Decalin at 135° C. in an internal mixer at a temperature of 130° C. and 5 percent by weight of the blend of titanium dioxide added. The composition was found to have a maximum percent creep of 8 percent and a Young's modulus of $7.6 \times 10^3$ p.s.i. and a flexural fatigue life of 3 million flexes or above and was very suitable for a fabricless cycle tire.

EXAMPLE VIII

An interpolymer containing 81 percent ethylene, 7.5 percent methacrylic acid (of which 1.1 percent was in the form of the sodium salt) and 11.5 percent vinyl acetate of intrinsic viscosity 0.53 in Decalin at 135° C. was found to have a maximum percent creep of 6 percent, a Young's modulus of $56 \times 10^3$ p.s.i., a flexural fatigue life of 10 million flexes or above and was very suitable for the production of fabricless cycle tires.

EXAMPLE IX

A blend of 70 parts by weight of a copolymer of ethylene and methacrylic acid as used in Example V with 30 parts by weight of an acrylic acid modified copolymer of butadiene and acrylonitrile of Mooney viscosity (ML–4 at 100° C.) 55–75 and containing 35–37 percent acrylonitrile by weight of the copolymer was prepared in an internal mixer at 130° C. The composition was found to have a maximum percent creep of 5 percent, a Young's modulus of $9.2 \times 10^3$ p.s.i. and a flexural fatigue life of 5 million flexes or above and was very suitable for the construction of fabricless cycle tires.

EXAMPLE X 100 parts by weight of a copolymer of ethylene and vinyl acetate, as used in Example II, were mixed with 5 parts by weight of dicumyl peroxide in an internal mixer at 120° C. for 10 minutes. A 1/16-inch thick sheet was compression moulded at 180° C. for 20 minutes and test-pieces cut from this cross-linked sheet showed the composition to have a minimum percent creep of 6 percent, a Young's modulus of $4.2 \times 10^3$ p.s.i., a flexural life of 10 million flexes or above and was more resilient and had a better temperature resistance than similar uncross-linked copolymers.

A tire was prepared by transfer moulding into the sidewall of the tire according to the method illustrated in FIGURE 6 and described previously in this specification between the platens of a press heated to 150° C. The cross-linking was completed by heating to 180° C. for 15 minutes and then after cooling whilst still under pressure a satisfactory tire was removed.

EXAMPLE XI

A blend of 50 parts by weight of a copolymer of ethylene and methacrylic acid as used in Example V with 50 parts by weight of a cis-1,4-polybutadiene of cis-content 97 percent and Mooney viscosity (ML–4 at 100° C.) 50 was prepared in an internal mixer at 150° C. and the following parts by weight of fillers added:

Lead carbonate _______________________________ 13.5
Titanium dioxide _____________________________ 4.0
Zinc oxide ___________________________________ 13.0

After cooling to 120° C., 3.25 parts by weight of dicumyl peroxide was added and mixed for a further 5 minutes.

A 1/16 inch thick sheet of this composition was cross-linked by compression moulding at 160° C. for 30 minutes and was found to have a maximum percent creep of 4 percent, a Young's modulus of $6.1 \times 10^3$ p.s.i. and a flexural fatigue resistance of 7 million flexes or above and was very suitable for the construction of fabricless cycle tires.

EXAMPLE XII

A blend of 45 parts isotactic polypropylene of melt-index 0.3 g./10 min. (BS. 2782, 105 C 2.16 kg./230° C.) and intrinsic viscosity 1.24 in Decalin at 135° C. with 55 parts of butyl rubber of Mooney viscosity (ML–4 at 100° C.) 74.0 containing 1.52 mole percent unsaturation and 5 parts titanium dioxide, all parts by weight, was prepared in an internal mixer, heated to 180° C. to 200° C. for 15 minutes. The material was sheeted hot between cold mill rolls to a nominal thickness of 3/16 inch.

The composition had a maximum percent creep of 3.0 percent and a Young's modulus of $2.8 \times 10^4$ p.s.i. The composition also had a flexural fatigue life of 12 million flexes or above.

Cycle tires were prepared by moulding according to the first method described and shown in FIGURES 1, 2 and 3 of the accompanying drawings, using a temperature of 220° C. and then subsequently cooling the mould prior to opening the mould to give a satisfactory tire.

Alternatively, a sheet of 3/4-inch thickness is prepared and moulded as a thick half-shell by not allowing the mould to fully close using spacers. The bead wires were located in the final mould by attaching small wire ferrules of a suitable thickness. The moulded half-shell was then placed in the top half of the final mould and by heating to 200° C. and subsequently applying pressure, was flow-moulded around into the second half of the final mould such that the bead wires were centrally-located in the finished section. The mould was cooled to extract the finished tire, which was satisfactory in all respects.

A further tire was produced by injecting the blended composition into a transfer mould similar to that shown in FIGURE 6 through a single transfer port in the sidewall region. In this method, a preheated strip of the blend was fed into a heated extruder positioned vertically above the transfer port of the heated mould. The mould was clamped sheet with bead wires positioned on either side of the solid centre core using wire ferrules and the pressure maintained until the mould was full and had been cooled when a satisfactory tire was produced.

EXAMPLE XIII

A blend of 45 parts of a crystalline copolymer of propylene and ethylene (ethylene being present only as a minor constituent, less than 5 percent molar) of melt-index of 0.2 g./10 min. (BS. 2782 at 230° C.) and intrinsic viscosity 2.97 in Decalin at 135° C. with 55 parts of an ethylene-propylene copolymer rubber (Mooney viscosity ML–4 at 100° C.) 35 containing 55 mole percent ethylene and 5 parts of titanium dioxide, all parts by weight, was prepared in an internal mixer heated to 180° C. to 200° C. for 15 minutes. The material was sheeted hot between cold mill rolls to a nominal thickness of 3/16-inch.

The composition had a maximum percent creep of 7 percent and a Young's modulus of $2.6 \times 10^4$. The composition also had a flexural fatigue life of 12 million flexes or more in contrast to that of a similar blend based on a crystalline homopolymer of propylene, as used in Example XII, which only had a flexural fatigue life of 2 million flexes. Satisfactory cycle tires were prepared in a like manner to those in Example XII.

EXAMPLE XIV

A blend of 45 parts of high density ethylene copolymer with butene-1 (the butene-1 being present at less than 5 mole percent) of melt-index 0.3 g./10 min. (BS. 2782 at 190° C.) and an intrinsic viscosity of 1.13 in Decalin at 135° C. with 55 parts of the butyl rubber as used in Example XII and 5 parts of titanium dioxide, all parts by weight, was prepared in an internal mixer heated to 160° C. to 180° C. for 15 minutes. The material was sheeted hot between cold mill rolls to a nominal thickness of 3/16-inch.

The composition had a maximum percent creep of 2 percent and a Young's modulus of $2.0 \times 10^4$ p.s.i. The composition also had a bural fatigue life of 2 million flexes in contrast to a similar blend based on a high density homopolymer of ethylene of similar melt-index which only had a flexural fatigue life of 500,000 flexes.

As judged by experience with other materials, it is anticipated that a satisfactory cycle tire could be made from this composition.

EXAMPLE XV

A blend of 50 parts of isotactic polybutene-1 of melt-index 0.3 g./10 min. (ASTM D. 1238, 5 kg./190° C.) and intrinsic viscosity of 1.5 in Decalin at 135° C. with 50 parts of butyl rubber, as used in Example XII, and 5 parts of titanium dioxide, all parts by weight, was prepared in an internal mixer, heated to 140° C. to 160° C. for 15 minutes. The material was sheeted hot between cold mill rolls to a nominal thickness of 3/16-inch.

The composition had a maximum percent creep of 3 percent and a Young's modulus of $1.3 \times 10^4$ p.s.i. The composition also had a flexural fatigue life of 12 million flexes or above.

Satisfactory tires were made according to the second method described in Example XII.

EXAMPLE XVI

A propylene polymer was prepared according to our British Patent No. 1,024,179 using a vanadium trichloride/titanium tetrachloride mixed catalyst in the ratio 1:2 by weight and aluminium triethyl, the ratio of catalyst:alkyl being 3:2 by weight, respectively, suspended in petrol. The catalyst was prepared by reducing titanium tetrachloride with aluminium triethyl, mixing with the reaction mixture vanadium tetrachloride, and reducing this to the trichloride with aluminium triethyl. Propylene gas was added at the rate of 36 litres/minute for 1 hour 35 minutes at 35° C. The reaction was terminated by flushing nitrogen gas through the reaction vessel and the polymer precipitated with isopropanol and concentrated ammonia. The polymer thus produced was examined by X-ray crystallography and found to be 18.5 percent crystalline. The polymer which had an intrinsic viscosity of 1.11 in Decalin at 135° C. contained 50 percent material, soluble in boiling heptane.

The polymer was mixed with 5 parts per hundred parts of polymer of titanium dioxide and was found to have a maximum percent creep of 2 percent and a Young's modulus of $2.2 \times 10^4$ p.s.i. The polymer composition also had a flexural fatigue life of 12 million flexes or above and was suitable for fabricless cycle tires.

EXAMPLE XVII

A blend of 50 parts isotactic polypropylene as used in Example XII with 50 parts of natural rubber (smoked sheet) was prepared as in Example XII.

The composition had a maximum percentage creep of 4 percent and a Young's modulus of $3.5 \times 10^4$ p.s.i. The composition also had a flexural fatigue life of 12 million flexes or above and was suitable for fabricless cycle tires.

EXAMPLE XVIII

A blend of 50 parts isotactic polypropylene, as used in Example XII, with 50 parts of styrene-butadiene rubber with a styrene-butadiene ratio of 23:77 (Intol 1500) was prepared as in Example XII.

The composition had a maximum percentage creep of 4 percent and a Young's modulus of $2.9 \times 10^4$ p.s.i. The composition also had a flexural fatigue life of 12 million flexes or above and was suitable for fabricless cycle tires.

EXAMPLE XIX

A blend of 40 parts of a crystalline high density ethylene homopolymer of melt-index 0.9 g./10 mins. (BS. 2782 method 105 C at 190° C.) and an intrinsic viscosity of 0.87 in Decalin at 135° C. with 60 parts of an ethylene-propylene copolymer rubber, as used in Example XIII and 5 parts of titanium dioxide, all parts by weight, was prepared in an internal mixer at 180° C. for 15 minutes. The blend was cooled to 120° C. and 3.5 parts by weight of dicumyl peroxide added and mixed for a further 5 minutes.

A 1/16-inch thick sheet of this composition was compression moulded at 180° C. for 20 minutes and this cross-linked material was found to have a maximum percent creep of 7 percent, a Young's modulus of $3.6 \times 10^3$ p.s.i., a flexural fatigue life of 10 million flexes or above, and was more resilient and had better temperature resistance than a similar uncross-linked blend.

Satisfactory tires can be prepared from this cross-linked blend material by a method similar to that described in Example X.

EXAMPLE XX

A blend of 40 parts of a crystalline high density ethylene homopolymer, as used in Example XIX, with 60 parts of an ethylene-propylene rubber as used in Example XIII, was prepared in an internal mixer at 180° C. for 15 minutes. The blend was then cooled to 130° C. and 0.6 part of ditertiary butyl peroxide and 3.0 parts of maleic acid were added and the mixture heated to 190° C. for 45 minutes when all the peroxide had decomposed and a maleic acid graft copolymer blend had been produced.

100 parts of this copolymer blend was taken and 2.5 parts of zinc oxide and 4.0 parts of stearic acid were added on a mill at 130° C. All parts are by weight.

A 1/16-inch thick sheet of this composition was prepared by compression moulding at 160° C. and was found to have a maximum percent creep of 8 percent, a Young's modulus of $9.8 \times 10^3$ p.s.i., a flexural fatigue life of 5 million flexes or above and was very suitable for the construction of fabricless cycle tires.

EXAMPLE XXI

The following composition was prepared in an internal mixer at 190° C. for 15 minutes. All figures given are parts by weight.

| | |
|---|---|
| Natural rubber (smoked sheet) | 100 |
| Isotactic polybutene-1 (see Example XV) | 50 |
| High abrasion furnace black | 40 |
| Blend of arylamines (Nonox HFN antioxident) | 2 |
| Aromatic processing oil | 3 |
| Stearic acid | 1 |
| Zinc oxide | 5 |

The mixture was then banded on a cool mill and 1.0 part by weight N-cyclohexyl-2-benzothiazole sulphenamide and 2.5 parts by weight of sulphur were added.

A 1/16-inch thick sheet of the composition was vulcanized by compression moulding at 150° C. for 20 minutes and was found to have a maximum percent creep of 7 percent in two directions at right-angles (no orientation), a Young's modulus of $2.0 \times 10^3$ p.s.i. and a flexural life of 10 million flexes or above.

Satisfactory tires can be prepared from this vulcanized composition by a method similar to that described in Example X with the vulcanization completed by heating to 150° C. for 20 minutes.

EXAMPLE XXII

The following composition was prepared in an internal mixer at 190° C. for 15 minutes. All figures given are parts by weight.

| | |
|---|---|
| Natural rubber (smoked sheet) | 100 |
| Isotactic polypropylene (see Example XII) | 30 |
| Fast extruding furnace black | 40 |
| Blend of arylamine (Nonox HFN antioxidant) | 2 |
| Aromatic processing oil | 3 |
| Stearic acid | 1 |
| Zinc oxide | 5 |

The mixture was then banded on a cool mill and 1.0 part by weight of N-cyclohexyl-2-benzothiazole sulphenamide and 3.0 parts by weight of sulphur were added. The polypropylene in the composition obtained from the cool mill was oriented and the properties of a 1/16-inch thick sheet vulcanized by compression moulding at 150° C. for 20 minutes were found to be different if measured with and against the direction of orientation.

| | With | Against |
|---|---|---|
| Maximum percent creep (percent) | 5 | 10 |
| Young's modulus (p.s.i.) | $3.08 \times 10^3$ | $1.79 \times 10^3$ |
| Flexural fatigue life (millions) | >10 | >10 |

For the construction of tires the orientation can be used advantageously by arranging for it to be radially in the direction of greatest stress due to inflation.

A satisfactory tire was prepared according to the method illustrated in FIGURES 4 and 5 and described previously in the specification with vulcanization completed by compression moulding at 150° C.

A tire was tested as described in Example I and run for 4,000 miles at 20 m.p.h. before tests were discontinued. Tires fitted to a bicycle and ridden around were found to have similar characteristics to conventional cycle tires.

An alternative method of preparing a cycle tire was according to the method illustrated in FIGURE 6 and described previously in the specification by transfer moulding through a number of transfer ports located on the midcircumferential plane of the tire and not through the ports located adajcent the sidewall. Vulcanization was completed as before giving a satisfactory tire.

EXAMPLE XXIII

An ethylene-propylene copolymer was prepared by passing a monomer mixture of ethylene and propylene in a molar ratio of 1:0.75 into a solution of vanadium oxychloride and aluminum diethyl chloride in molar ratio of 1:11.7 in petrol at −12° C. Prior to passing the monomer mixture of ethylene and propylene the solution was purged with nitrogen gas. The monomer mixture was then passed into the solution for 5 minutes at a rate of 18 litres per minute. Any unreacted monomer was then removed by purging with nitrogen for 5 minutes and then a further amount of monomer mixture was passed into the catalyst solution for 5 minutes. The procedure of purging and polymerization was repeated until the monomer mixture had been passed through the solution for a total of 15 minutes.

The polymerization was terminated and the copolymer precipitated. Any excess solvent was removed from the polymer by milling between heated rolls.

The resulting polymer contained 15 percent propylene and had an intrinsic viscosity of 3.6 in Decalin at 135° C.

The polymer had a maximum percent creep of 4 percent, a Young's modulus of $2.2 \times 10^4$ p.s.i. and a flexural fatigue life of 12 million flexes or above and was, therefore, suitable for fabricless cycle tires.

EXAMPLE XXIV

An ethylene-propylene copolymer was prepared as described in Example XXIII, except that the molar gas ratio of ethylene:propylene was 1:1. 80 parts of this polymer were then blended with 20 parts of a high density ethylene homopolymer of melt flow index 0.9 g./10 mins. (BS.1972–53, 2.16 kg./190° C.) and intrinsic viscosity of 0.87 in Decalin at 135° C. and 5 parts of titanium dioxide, all parts by weight.

The composition had a maximum percent creep of 8.0 percent and a Young's modulus of $1.2 \times 10^4$ p.s.i. The composition also had a flexural fatigue life of 12 million flexes or above, and was satisfactory for fabricless cycle tires.

EXAMPLE XXXV 100 parts by weight of an ethylene-propylene copolymer as described in Example XXIII was mixed with 2 parts by weight of 2,2,5,5-tetra-tertiary-butyl peroxy-hexane (available as a 40 percent solid dispersion on a white filler) in an internal mixer at 120° C. for 10 minutes.

A 1/16-inch thick sheet of this composition was compression moulded at 180° C., for 20 minutes and this cross-linked material had a maximum percent creep of 5 percent, a Young's modulus of $5.1 \times 10^3$ p.s.i. and a flexural fatigue life of 10 million flexes or above.

Satisfactory tires can be prepared from this cross-linked composition by a method similar to that described in Example X.

Having now described our invention, what we claim is:

1. A fabricless pneumatic tire comprising a pair of spaced beads and a shaped flexible composition extending from one bead to the other to form the sidewall portions and tread portion of the tire, said flexible composition having a Young's Modulus of at least $4.5 \times 10^2$ pounds per square inch and an elongation (creep) of not more than 15 percent in length when subjected to a load of 100 pounds per square inch of sectional area at a temperature of 30° C. over a period of one month.

2. A fabricless pneumatic tire according to claim 1 in which said tire is a cycle tire and the shaped flexible composition has a flexural fatigue life of at least 1 million flexes.

3. A fabricless pneumatic tire according to claim 2 in which the shaped flexible composition has a flexural fatigue life of at least 4 million flexes.

4. A fabricless pneumatic tire according to claim 1, in which said flexible composition comprises a member selected from the group consisting of (1) an interpolymer of ethylene with a member selected from the group consisting of a vinyl alkanoic ester, an alkyl acrylate, an alkyl methacrylate, and an unsaturated acid, wherein ethylene is present in an amount of at least 60% by weight of the interpolymer, and (2) blends of interpolymer (1) with natural or synthetic rubber.

5. A fabricless pneumatic tire according to claim 4, wherein said flexible composition comprises a copolymer of ethylene with about 5 to 30% by weight of a member selected from the group consisting of vinyl acetate and ethyl acrylate.

6. A fabricless pneumatic tire according to claim 4, in which said flexible composition comprises a copolymer of ethylene with up to about 40 weight percent of the copolymer of an unsaturated carboxylic acid.

7. A fabricless pneumatic tire according to claim 6, in which said copolymer is formed from ethylene and an unsaturated monocarboxylic acid in which at least 50% by weight of said acid is present in the form of a metal salt of a monocarboxylic acid in which the metal has a valence of from 1 to 4.

8. A fabricless pneumatic tire according to claim 1, in which said flexible composition comprises a blend of (1) about 15–70° based on the weight of the composition of a crystalline polymer selected from the group consisting of crystalline olefin homopolymers and copolymers, with (2) a member selected from the group consisting of natural rubber, synthetic rubber, a rubbery homopolymer of an alpha-olefin, and a rubbery copolymer of an alpha-olefin.

9. A fabricless pneumatic tire according to claim 8, in which said blend comprises (1) crystalline polypropylene and (2) a member selected from the group consisting of natural rubber and synthetic rubber.

10. A fabricless pneumatic tire according to claim 1, in which said flexible composition comprises a member selected from the group consisting of (1) a plastomeric copolymer of ethylene and an alpha-olefin containing at least 50 mol percent of ethylene and in which portions of the molecular chain contain blocks of polyethylene and (2) a blend of said plastomeric copolymer (1) with a crystalline polymer of an alpha-olefin containing crystalline material in an amount of up to 40 weight percent of the blend.

11. A fabricless pneumatic tire according to claim 10, in which said flexible composition comprises a plastomeric copolymer of from 70 to 90 mol percent of ethylene with an alpha-olefin, and in which portions of the molecular chain contain blocks of polyethylene.

12. A fabricless pneumatic tire according to claim 1, in which said flexible composition is cross-linked.

References Cited

UNITED STATES PATENTS

| | | | |
|---|---|---|---|
| 2,902,072 | 9/1959 | Reuter | 152—330 |
| 3,208,500 | 9/1965 | Knipp et al. | 152—327 |

ARTHUR L. LA POINT, *Primary Examiner.*

C. B. LYON, *Assistant Examiner.*